C. OESTER.
Vehicle Running Gear.
No. 214,579. Patented April 22, 1879.
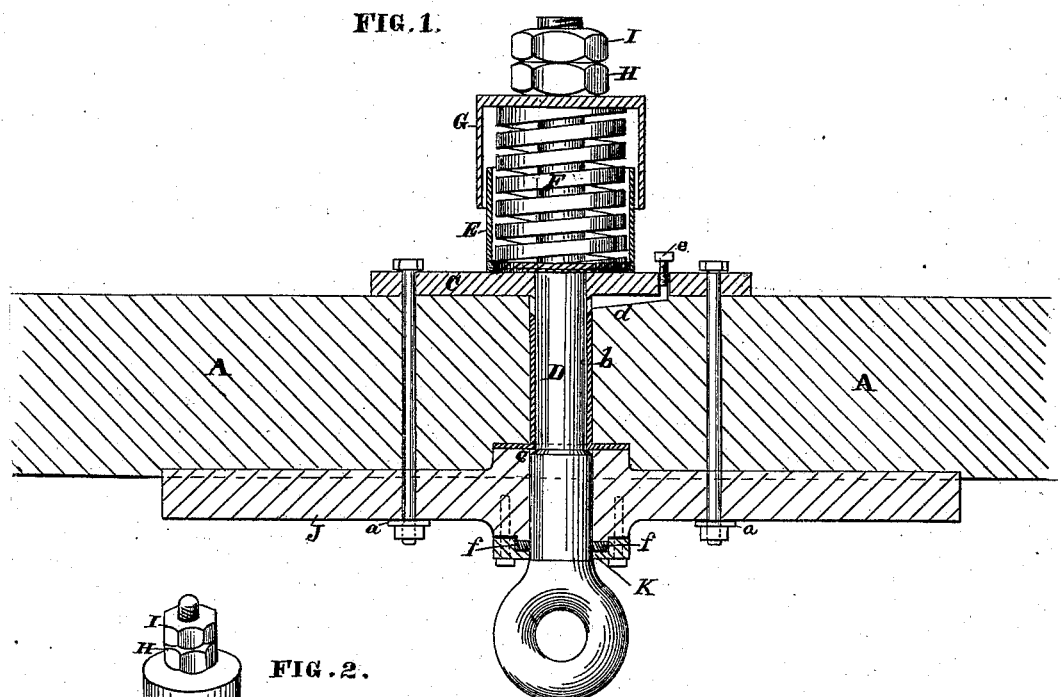
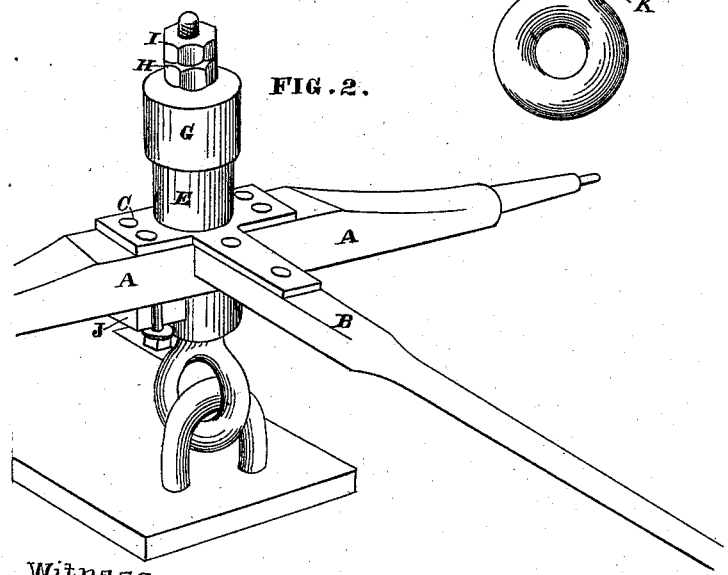
Witnesses
Geo. H. Strong.
Frank A. Brooks.
Inventor
Charles Oester
By Dewey & Co.
Attys

UNITED STATES PATENT OFFICE.

CHARLES OESTER, OF SAN FRANCISCO, CALIFORNIA.

IMPROVEMENT IN VEHICLE RUNNING-GEARS.

Specification forming part of Letters Patent No. 214,579, dated April 22, 1879; application filed February 6, 1879.

*To all whom it may concern:*

Be it known that I, CHARLES OESTER, of the city and county of San Francisco, and State of California, have invented an Improvement in Vehicles; and I hereby declare the following to be a full, clear, and exact description thereof.

My invention relates to improvements in that class of vehicles known as "trucks," which are made for carrying heavy weights; and my improvements refer more particularly to the construction and operation of the king-bolt, or that portion joining the body of the truck to the front axle, about which the front wheels move in the arc of a circle.

My improvements consist in the application of a coiled spring around the king-bolt above the axle, in such a manner as to lessen the jar incident to this part of the vehicle and insure a more perfect action of the forward axle and wheels.

It also consists in a method of inclosing this spring out of the way of the dust, in a means of oiling the bearing, and in certain details of construction, which are more fully described in the accompanying drawings, in which—

Figure 1 is a section of my device. Fig. 2 shows its application.

Let A represent the forward axle of a truck, and B the pole to which the horses are attached. On top of the axle, at that part where the pole is attached, is a metal plate, C, through which the king-bolt D projects. On that portion of the bolt D above the axle is a cup-shaped cylinder, E, which extends upward, its bottom resting on the metal plate C, and the bolt D projecting through it. Over the bolt D is slipped a strong coiled spring, F, which encircles said bolt, and occupies part of the space between the bolt and the inner portion of the cylinder E, its lower end resting on the bottom of said cylinder. The spring itself is somewhat longer than the cylinder E and projects above it.

Another cup-shaped cylinder, G, somewhat larger than the other or lower one, is slipped over the bolt D and incloses the spring, and, its top being closed except where the bolt passes through it, thus rests on the spring. This cylinder G has its lower end open, and it projects down outside the lower cylinder. The upper end of the bolt D is threaded, and on it are screwed the nut H and lock-nut I, thus inclosing the spring within the two cup-shaped cylinders.

The lower end of the bolt D has an eye formed in it, by which the truck-body is attached. Now, any weight on the forward end of the truck will bear on the coiled spring, as the upper cylinder, G, rests on said spring, and the nuts on the bolt D, in turn, rest on the head of this cylinder. In this way, therefore, all jar is removed from the truck, as the spring takes the strain. All dust is prevented from getting into the spring by the double cylinders inclosing it, as described.

On the under side of the axle is a stout metal plate, J, having a central opening, as shown. This plate J is held in position by four bolts passing through the axle and riveted to the upper plate, C. Washers or plates $a$ connect the lower ends of these pairs of bolts, and serve to retain the lower plate, J, close against the axle. After the bolt D is put in place, a bushing of Babbitt metal, $b$, is filled in around the bolt in the wooden part of the axle.

The central opening in the plate J is larger than that through the wood of the axle, and a shoulder, $c$, is formed in the plate, against which a corresponding shoulder formed in the king-bolt impinges.

The shoulder on the king-bolt is formed conically, as shown, and fits snugly in the plate.

The lower opening around the king-bolt is kept tight, and the oil is prevented from escaping by making a channel, $f$, which surrounds the king-bolt and allows packing to be introduced, which will make a perfectly-tight joint.

Below the washer $f$ a cap, K, is fitted and properly secured, and by this device the oil is retained, dust is kept out, and no new oil will be needed for a long time. An oil-hole, $d$, closed by a screw, $e$, is formed in the upper plate, and leads the oil down to the bolt.

It will be seen that since the truck is suspended by the eyebolt on which is the spring, as described, whenever obstructions in the road are passed over, the vehicle will not jar, but will ride easy. The king-bolt will always be properly lubricated, and no dust can get around it or to the spring.

Having thus described my invention, what I claim as new, and desire to secure by Letters Patent, is—

1. The king-bolt D, supporting the truck-body and resting upon or suspended from the spring F, said spring being inclosed in the cup E and having the telescopic dust-cap G, whereby motion is permitted, while the spring and king-bolt are protected from dust, substantially as herein described.

2. The axle A, perforated, as shown, and provided with the metallic bushing $b$, and the plates C J, secured to the top and bottom of the axle, in combination with the king-bolt D, spring F, dust-cap, and lubricator $d$, substantially as and for the purpose herein described.

3. The king-bolt D, moving vertically through the axle A and supporting the truck-body from the spring F, in combination with the plate C, with its spring-case E G, and the plate J, having the cap K and the packing-chamber $f$, substantially as and for the purpose herein described.

In witness whereof I have hereunto set my hand.

CHARLES OESTER.

Witnesses:
GEO. H. STRONG,
FRANK A. BROOKS.